United States Patent [19]

Yamauchi

[11] Patent Number: 5,001,578
[45] Date of Patent: Mar. 19, 1991

[54] METHOD AND SYSTEM FOR CONTROLLING DISK RECORDING AND REPRODUCTION APPARATUS FOR REDUCED POWER CONSUMPTION

[75] Inventor: Masafumi Yamauchi, Oome, Japan

[73] Assignee: Kabushiki Kaisha Toshiba, Kawasaki, Japan

[21] Appl. No.: 257,579

[22] Filed: Oct. 14, 1988

[30] Foreign Application Priority Data

Oct. 15, 1987 [JP] Japan .................. 62-260091

[51] Int. Cl.$^5$ .................. G11B 15/46; G11B 19/28
[52] U.S. Cl. .................. 360/73.03; 360/69; 360/78.04
[58] Field of Search .............. 360/73.03, 78.04, 78.06, 360/70, 69

[56] References Cited

U.S. PATENT DOCUMENTS 4,680,746 7/1987 Senso .................. 360/73.03 X
4,709,279 11/1987 Sano .................. 360/69

OTHER PUBLICATIONS

IBM Journal of Research and Development, Feb. 1980, pp. 41–44, "The IBM 3370 Head-Positioning Control System".
Research Implementation Report, vol. 28, No. 10 (1979), pp. 179 to 194, "800 Mega-Bytes Magnetic Disc Devices Peripheral Circuit".
Tricheps (Transliterated) "Servo Technique Implementation Manual", pp. 31—38 to 31-11 (1983), "Spindle Rotation Number Control".

Primary Examiner—A. J. Heinz
Attorney, Agent, or Firm—Finnegan, Henderson, Farabow, Garrett, and Dunner

[57] ABSTRACT

In a recording and reproduction apparatus, a recording medium is rotation-driven by a spindle motor, and a carriage having magnetic heads for seeking on the recording medium is driven by a voice coil motor. When a rotation velocity of the recording medium during acceleration and deceleration periods in a seeking-operation of the magnetic head is within an allowable range, a supply of a driving-current to the spindle motor is stopped in accordance with a level of a driving-current supplied to the voice coil motor. A consumption current of the recording and reproduction apparatus can be reduced without degrading performance of the apparatus.

5 Claims, 5 Drawing Sheets

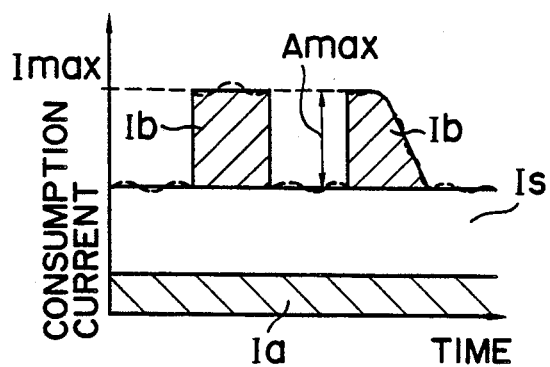
F I G. 1
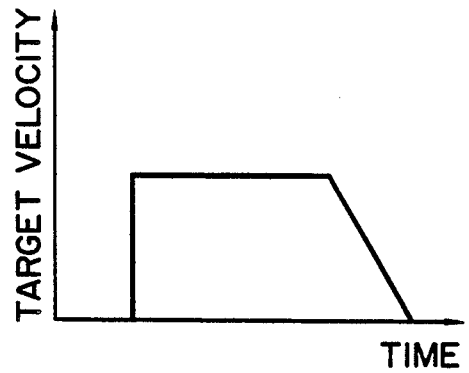
F I G. 4
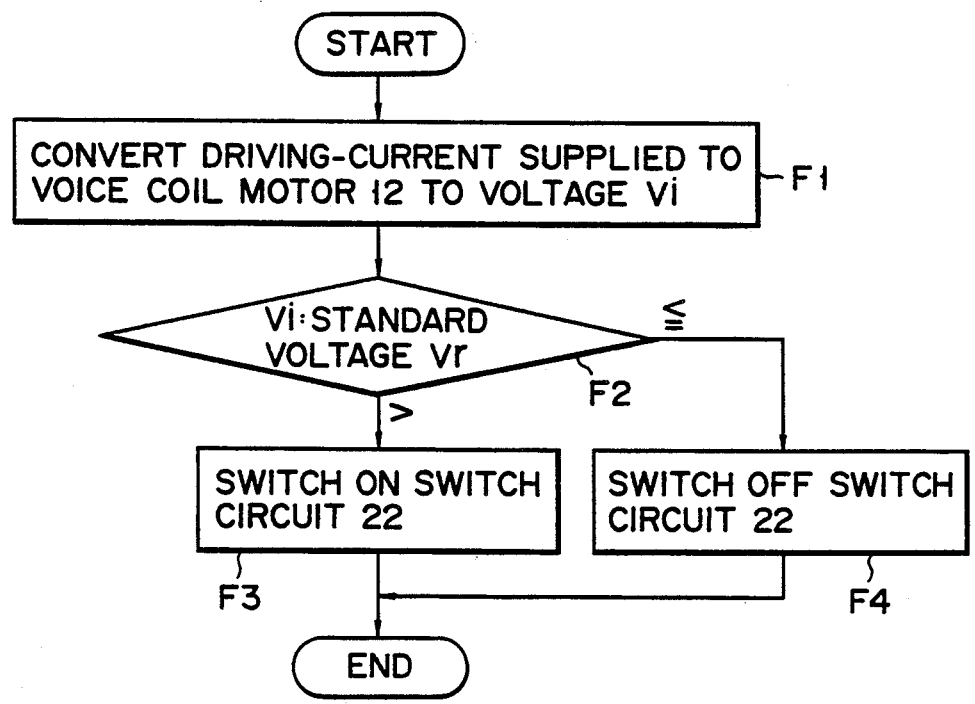
F I G. 3B

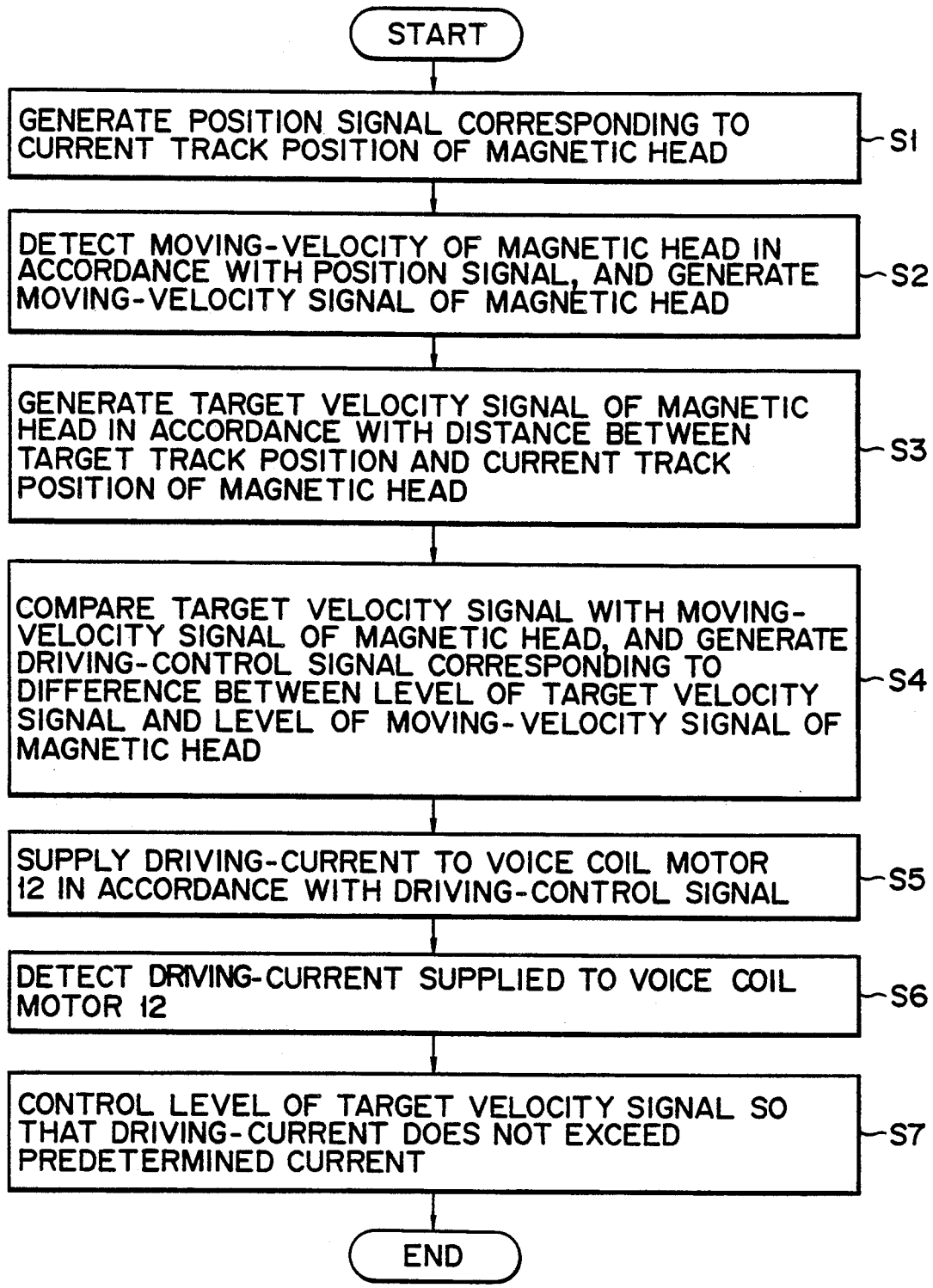
F I G. 3A

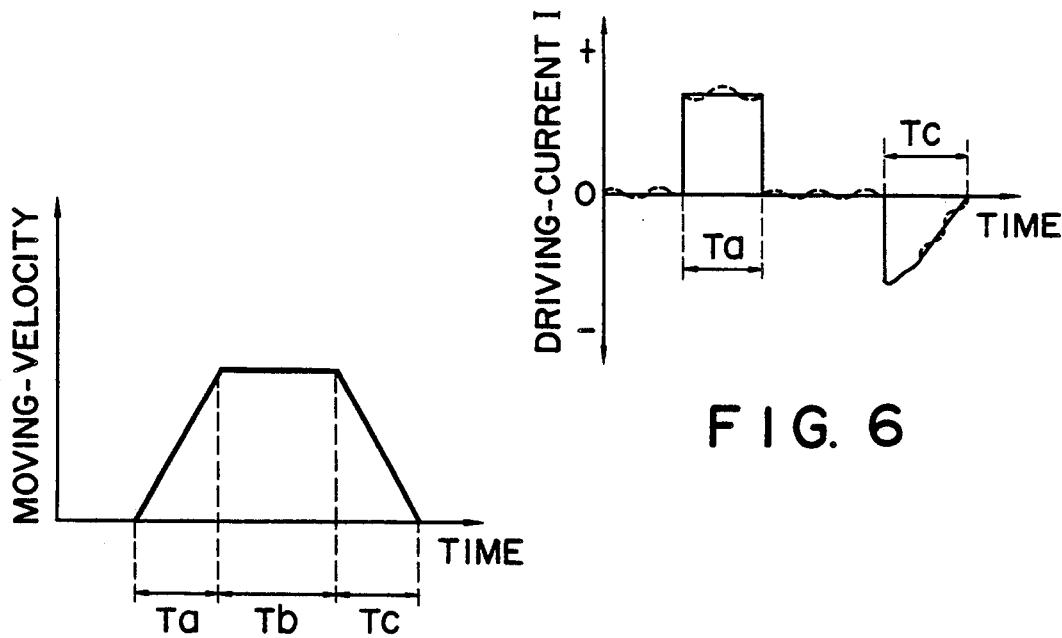
FIG. 6
FIG. 5
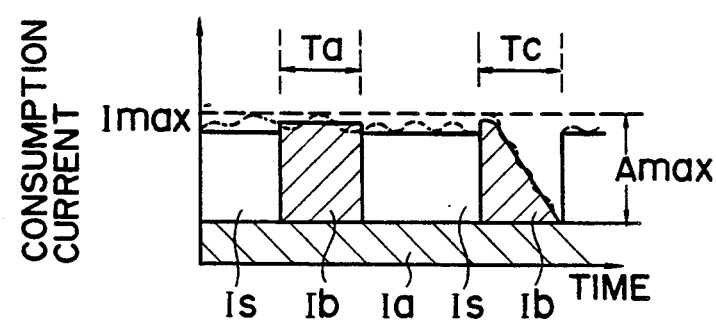
FIG. 8
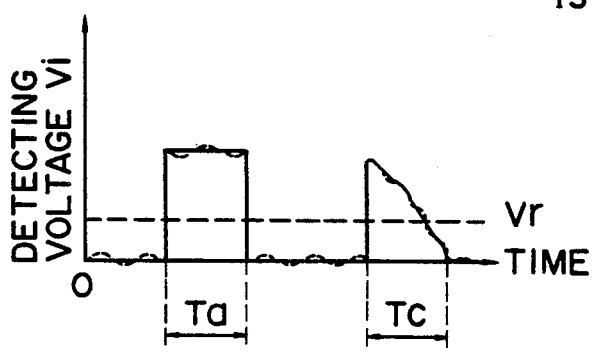
FIG. 7

METHOD AND SYSTEM FOR CONTROLLING DISK RECORDING AND REPRODUCTION APPARATUS FOR REDUCED POWER CONSUMPTION

BACKGROUND OF THE INVENTION

1. Field of the Invention

The present invention relates to a method and system for controlling a recording and reproduction apparatus.

2. Description of the Related Art

In a conventional recording and reproduction apparatus, e.g., a hard disk apparatus, a magnetic recording medium (disk) is rotation-driven by a spindle motor, and magnetic heads seek on the disk to perform a data read/write operation. The magnetic heads are mounted on a carriage and seek on the disk when the carriage is driven by a voice coil motor, thereby positioning on a target track.

In the hard disk apparatus, since the spindle motor, the voice coil motor, and the like are simultaneously driven as described above, power consumption of the apparatus is increased. More specifically, as shown in FIG. 1, a consumption current of the hard disk apparatus is a total sum of consumption current Ib of the voice coil motor, consumption current Is of the spindle motor, and consumption current Ia of other circuits. The magnetic heads to be seek-controlled move at a moving-velocity having an acceleration period, a constant-velocity period, and a deceleration period. In the constant-velocity period, the consumption current of the voice coil motor is reduced very much. For this reason, the consumption current Ib of the voice coil motor during the acceleration and deceleration periods becomes as shown in FIG. 1, and the maximum value $I_{max}$ of the consumption current of the hard disk apparatus is determined in accordance with the maximum value $A_{max}$ of consumption current Ib of the voice coil motor.

Therefore, in order to reduce the consumption current of the hard disk apparatus, the maximum value $A_{max}$ of consumption current Ib of the voice coil motor may be reduced. However, when the consumption current Ib of the voice coil motor is simply reduced, a seeking-velocity of the magnetic heads is reduced, and performance of the hard disk apparatus is degraded.

For this reason, a demand has arisen for a recording and reproduction apparatus, e.g., a hard disk apparatus capable of reducing the consumption current without degrading performance of the apparatus.

SUMMARY OF THE INVENTION

It is an object of the present invention to provide a method and system for controlling a recording and reproduction apparatus such that a consumption current of the apparatus can be reduced without degrading performance of the apparatus.

According to one aspect of the present invention, there is provided a method for controlling a driving of a carriage having at least one recording and reproduction head and a rotation of a recording medium, the method comprising the steps of: rotation-driving the recording medium in accordance with a recording medium driving-current; driving the carriage seeking on the recording medium by supplying a carriage driving-current in accordance with a seek command; and selectively supplying the recording medium driving-current in accordance with the carriage driving-current.

According to another aspect of the present invention, there is provided a system for controlling a driving of a recording and reproduction apparatus, the system comprising: carriage means having at least one recording and reproduction head seeking on a recording medium; recording medium driving means for rotation-driving the recording medium in accordance with a recording medium driving-current; carriage driving means for driving the carriage means by supplying a carriage driving-current in accordance with a seek command; carriage control means for controlling the carriage driving means by supplying a seek command; and recording medium control means for controlling the recording medium driving means in accordance with the carriage driving-current.

BRIEF DESCRIPTION OF THE DRAWINGS

FIG. 1 is a graph showing a consumption current in a conventional apparatus;

FIGS. 3A and 3B are flow charts for explaining an operation of the system according to the first embodiment of the present invention;

FIG. 4 is a graph showing a target velocity signal of magnetic heads under seeking-control;

FIG. 5 is a graph showing a moving-velocity of the magnetic heads under seeking-control;

FIG. 6 is a graph showing a driving-current supplied to a voice coil motor;

FIG. 7 is a graph showing a voltage waveform corresponding to a driving-current waveform supplied to the voice coil motor;

FIG. 8 is a graph showing a consumption current in the system according to the first embodiment of the present invention.

DETAILED DESCRIPTION OF THE PREFERRED EMBODIMENTS

Embodiments of the present invention will be described below with reference to the accompanying drawings.

Figure 2:
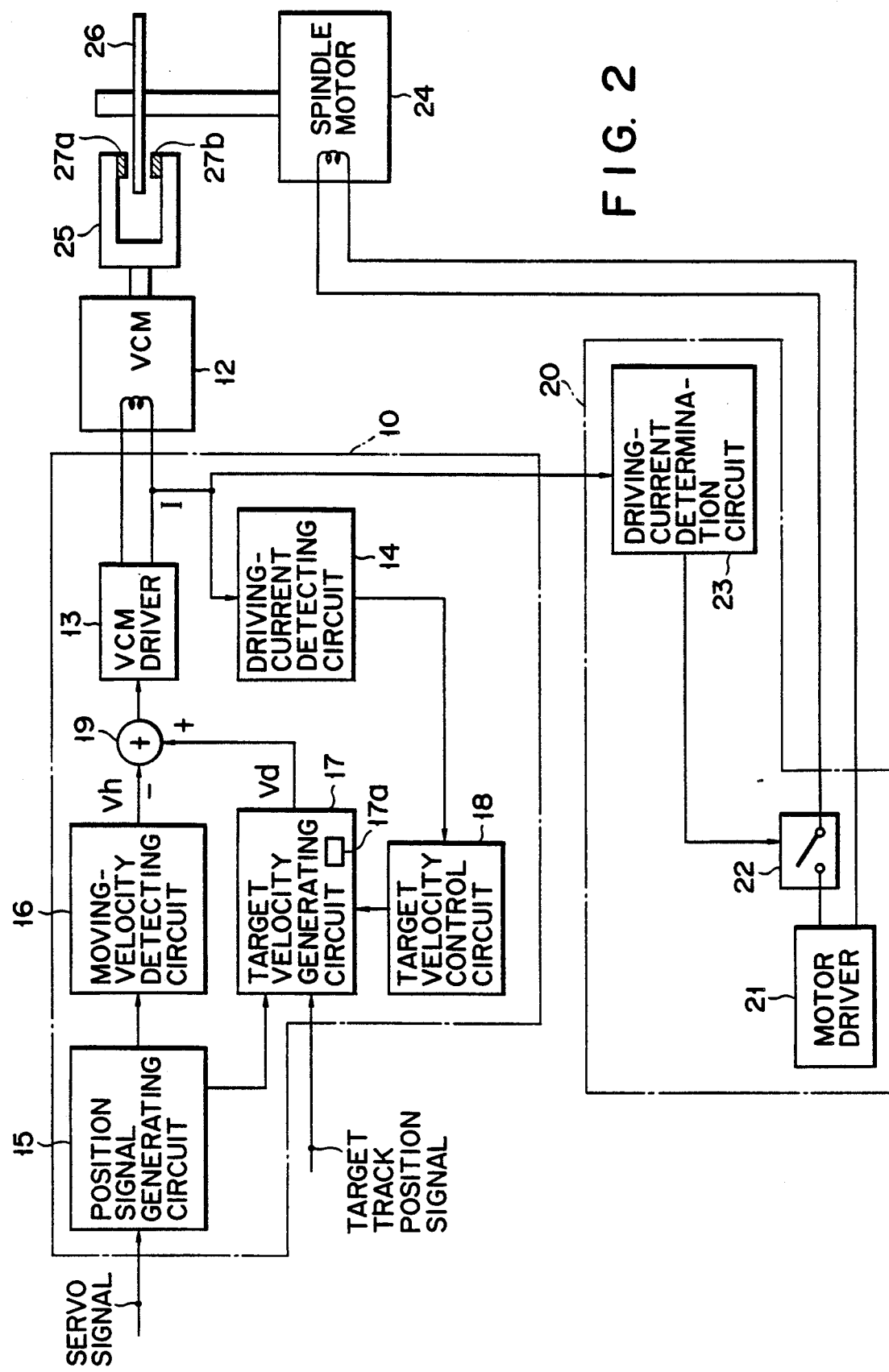
FIG. 2 is a block diagram showing an arrangement of a system according to a first embodiment of the present invention.

In FIG. 2, a system according to a first embodiment comprises voice coil motor (VCM) 12 for driving carriage 25 having magnetic heads 27a and 27b, VCM driving-control circuit 10 for controlling the positions of magnetic heads 27a and 27b on disk 26 using VCM 12, spindle motor 24 for rotation-driving disk 26, and spindle motor driving-control circuit 20 for controlling a rotation of disk 26 using spindle motor 24.

VCM driving-control circuit 10 comprises VCM driver 13 for supplying driving-current I to VCM 12 and driving-current detecting circuit 14 for detecting driving-current I. Circuit 10 further comprises position signal generating circuit 15, moving-velocity detecting circuit 16, target velocity generating circuit 17, target velocity control circuit 18, and operational amplifier 19.

Position signal generating circuit 15 generates a position signal corresponding to positions of magnetic heads 27a and 27b on disk 26 in a seeking-operation in accordance with a servo signal read out from disk 26 and outputs the position signal to moving-velocity detecting circuit 16. Circuit 16 detects an actual moving-velocity of the magnetic heads in the seeking-operation by differentiating the position signal output from generating circuit 15 and outputs a moving velocity signal indicating the detected moving-velocity to amplifier 19. Target velocity generating circuit 17 generates a target velocity signal corresponding to a target velocity determined in accordance with a target track position to which the magnetic heads are to be moved and a current track position and outputs the signal to amplifier 19. Note that circuit 17 has target velocity table 17a for storing target velocity data. Target velocity control circuit 18 controls a level of the target velocity signal generated by generating circuit 17 in accordance with driving-current I detected by detecting circuit 14 so that driving-current I does not exceed a predetermined current value. Amplifier 19 compares a level of the moving-velocity signal output from detecting circuit 16 and that of the target velocity signal output from generating circuit 17 and outputs a driving-control signal (seek command) corresponding to the level difference to VCM driver 13. VCM driver 13 supplies driving-current I to VCM 12 in accordance with the driving-control signal output from amplifier 19.

Spindle motor driving-control circuit 20 comprises motor driver 21 for supplying a driving-current to spindle motor 24, switch circuit 22 for interrupting the driving-current supplied to motor 24, and driving-current determination circuit 23 for determining a level of driving-current I supplied from VCM driver 13 to VCM 12. When a level of detecting-voltage Vi corresponding to driving-current I is over that of standard voltage Vr, determination circuit 23 switches off switch circuit 22, thereby interrupting a supply of the driving-current to motor 24.

An operation of the system according to the first embodiment will be described below with reference to the flow charts shown in FIGS. 3A and 3B.

When a driving power source of the system according to the first embodiment is switched on, a driving-current is supplied from motor driver 21 to spindle motor 24, and disk 26 starts rotation by a driving of motor 24. In this case, switch circuit 22 is switched on. Then, seeking-control of the magnetic heads is started in accordance with a seek command supplied from a host computer (not shown). That is, carriage 25 having magnetic heads 27a and 27b is driven to move magnetic heads 27a and 27b to a target track position on disk 26.

VCM driving-control circuit 10 operates in accordance with the flow chart shown in FIG. 3A.

In step S1, position signal generating circuit 15 generates a position signal corresponding to a current track position of the magnetic heads in a seeking-operation. In step S2, moving-velocity detecting circuit 16 detects a moving-velocity of the magnetic heads in accordance with the position signal generated in step S1 and generates moving-velocity signal Vh corresponding to the detected moving-velocity. Signal Vh is supplied to operational amplifier 19.

In step S3, target velocity generating circuit 17 generates a target velocity in accordance with a distance between a target track position to which the magnetic heads are to be moved and a current track position and outputs target velocity signal Vd as shown in FIG. 4 to amplifier 19. More specifically, generating circuit 17 obtains a distance (number of tracks) between the target and current track positions of the magnetic heads and detects target velocity data corresponding to the distance from the target velocity data stored in target velocity table 17a. The detected target velocity data is converted to signal Vd and then output to amplifier 19.

In step S4, amplifier 19 compares levels of signals Vd and Vh and generates a driving-control signal corresponding to a difference between the levels. This driving-control signal is output to VCM driver 13. In step S5, VCM driver 13 supplies driving-current I to VCM 12 in accordance with the driving-control signal output from amplifier 19. As a result, carriage 25 is driven by VCM 12, and magnetic heads 27a and 27b seek on disk 26.

In step S6, driving-current I supplied to VCM 12 is detected by driving-current detecting circuit 14. In step S7, target velocity control circuit 18 controls the level of signal Vd generated in step S3 so that the driving-current detected in step S6 is within a predetermined current.

In this case, the magnetic heads move at a moving-velocity having acceleration, constant-velocity, and deceleration periods Ta, Tb, and Tc under the seeking-control described above (FIG. 5). As shown in FIG. 6, VCM driver 13 supplies driving-currents I in opposite phases during acceleration and deceleration periods Ta and Tc in the seeking-operation of the magnetic heads to VCM 12. Note that since the moving-velocity of the magnetic heads is almost equal to their target velocity during constant-velocity period Tb, driving-current I supplied to VCM 12 is reduced very much.

During the seeking-operation of the magnetic heads, the spindle motor driving-control circuit 20 operates in accordance with the flow chart shown in FIG. 3B.

Driving-current determination circuit 23 detects driving-current I output from VCM driver 13 and determines the increase/decrease in driving-current I during acceleration and deceleration periods Ta and Tc of the magnetic heads in the seeking-operation. That is, circuit 23 converts driving current I supplied to VCM 12 to a voltage (step F1) and checks whether or not a level of converted detecting-voltage Vi exceeds that of predetermined standard voltage Vr (step F2). As a result, it is checked whether or not the level of voltage Vi corresponding to driving-current I during acceleration and deceleration periods Ta and Tc in the seeking-operation exceeds that of voltage Vr as shown in FIG. 7. If the level of voltage Vi is over that of voltage Vr in step F2, switch circuit 22 is switched off by determination circuit 23 (step F4), thereby stopping the supply of the driving-current from motor driver 21 to spindle motor 24. For this reason, the driving of motor 24 is stopped. However, since a rotation velocity is not much reduced for a predetermined period by inertia, almost a constant rotation velocity is maintained in this period. Driving-current I supplied to VCM 12 during constant velocity period Tb is very small. Therefore, if the level of voltage Vi is under that of voltage Vr in step F2, switch circuit 22 is switched on by determination circuit 23 (step F3). As a result, a driving-current is supplied from driver 21 to motor 24.

In this manner, driving-control of VCM 12 and motor 24 is performed.

Figure 9:
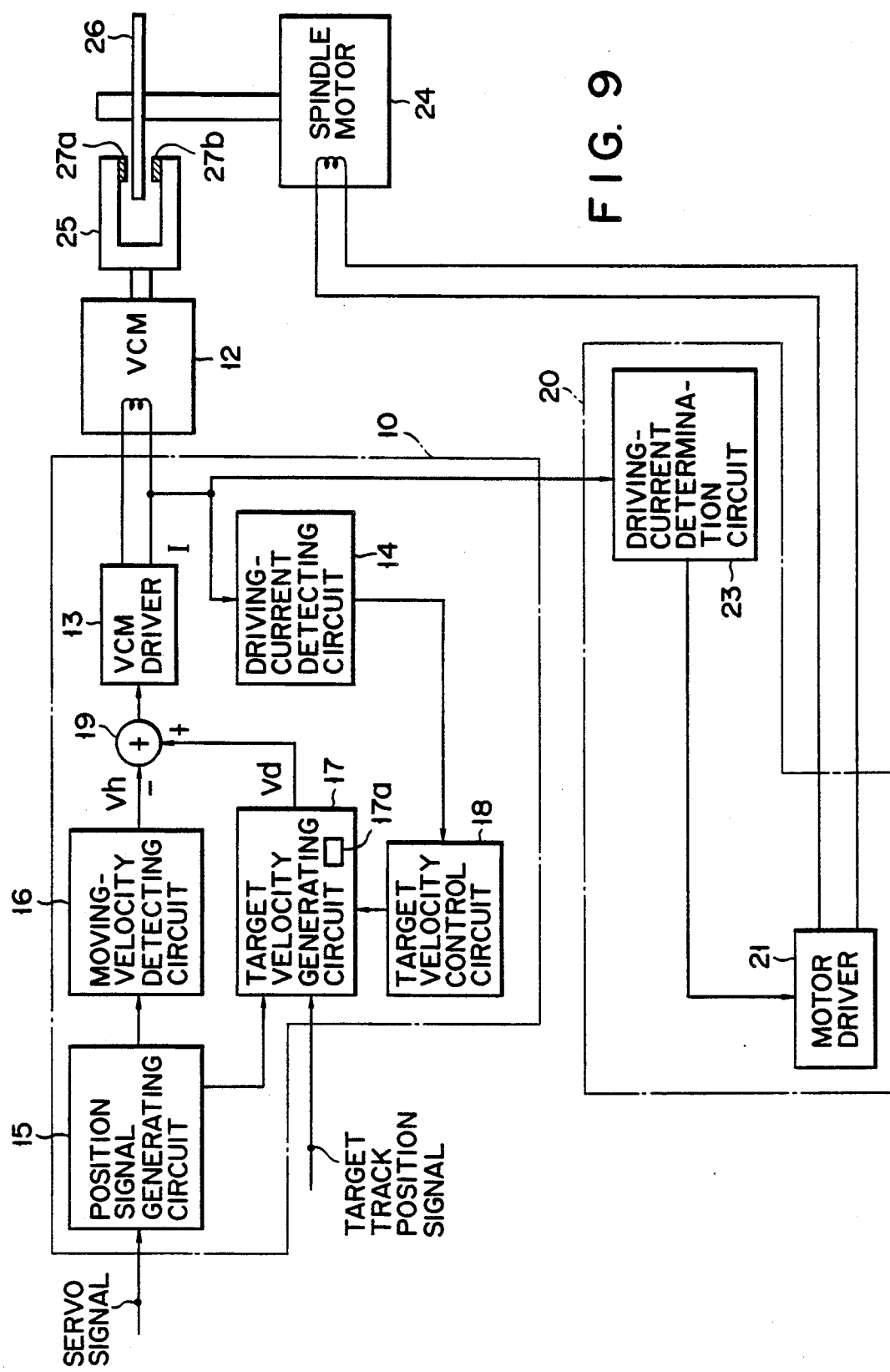
FIG. 9 is a block diagram showing an arrangement of a system according to a second embodiment of the present invention.

In a system according to a second embodiment of the present invention as shown in FIG. 9, switch circuit 22 in the system of the first embodiment is not used. That is, the supply of the driving-current to spindle motor 24 is stopped by controlling motor driver 21 directly by driving-current determination circuit 23.

In this manner, the supply of the driving-current to motor 24 is stopped in acceleration and deceleration periods Ta and Tc in which driving-current I is supplied to VCM 12, and the consumption current Is of motor 24 becomes very small. Therefore, as shown in FIG. 8, the consumption current of the apparatus becomes, the total sum of consumption current Ib of VCM 12 and consumption current Ia of other circuits. As a result, the consumption current of the apparatus during acceleration and deceleration periods Ta and Tc in the seeking-operation can be reduced smaller than that of the conventional system (FIG. 1) by an amount of consumption current Is of motor 24. In this case, the maximum value of the consumption current of the apparatus becomes, e.g., the consumption current during deceleration period Tc in the seeking-operation.

Note that acceleration and deceleration periods Ta and Tc in the seeking-operation are a short period of about several m sec to several tens of m sec and the inertia of motor 24 is comparatively large. Therefore, even if the supply of the driving-current to motor 24 is temporarily stopped, the rotation velocity of the motor 24 is not greatly reduced. For this reason, the rotation velocity of the disk is not greatly reduced, and the operation can be maintained in the allowable range of the system.

As has been described above in detail, in a hard disk apparatus or the like, the consumption current of the apparatus can be reduced without a decrease of the seeking-velocity of the magnetic head and without the rotation velocity falling outside the allowable range of the disk. Therefore, the power source capacity can be reduced without degrading performance of the apparatus, thereby realizing a compact apparatus. In addition, since the maximum value of the consumption current can be reduced, the amount of heat generated in the apparatus or the fault rate of the respective parts constituting the apparatus can be reduced. Furthermore, when a hard disk apparatus or the like is driven by a battery, energy saving can be achieved.

Several embodiments of the present invention have been described in detail above. However, the present invention is not limited to the above embodiments but can be variously modified without departing from the spirit and scope of the present invention.

What is claimed is:

1. A recording and reproduction apparatus comprising:
    a spindle motor for rotating a recording medium in accordance with a first driving current to be supplied;
    spindle motor driving means for supplying the first driving current to the spindle motor to drive the spindle motor;
    carriage means for carrying at least one head for recording and reproducing data to and from the recording medium;
    carriage moving means for moving the carriage means in accordance with a second driving current to be supplied in order to move the head to a desired position on the recording medium;
    carriage driving means for supplying the second driving current to the carriage moving means to move the carriage means; and
    controlling means for stopping a supply of the first driving current to the spindle motor by the spindle motor driving means to stop a drive of the spindle motor when a moving period of the carriage means moved by the carriage moving means is one of acceleration and deceleration moving periods.

2. The apparatus according to claim 1, wherein the controlling means includes determining means for determining whether or not a value of the second driving current supplied to the carriage moving means by the carriage driving means is equal to and larger than a desired value;
    wherein the supply of the first driving current to the spindle motor by the spindle motor driving means is stopped in accordance with a determination result by the determining means to stop the drive of the spindle motor.

3. A method for controlling a recording and reproduction apparatus, the method comprising the steps of:
    supplying a first driving current to a spindle motor to rotate a recording medium;
    supplying a second driving current to a voice coil motor to move at least one head for recording and reproducing data to and from the recording medium, thereby setting the head into a desired position on the recording medium;
    stopping a supply of the first driving current to stop a drive of the spindle motor when a moving period of the head is one of the acceleration and deceleration moving periods.

4. The method according to claim 3, wherein the stopping step includes the step of determining whether or not a value of the second driving current is equal to and larger than a desired value;
    wherein the supply of the first driving current is stopped in accordance with a determination result to stop the drive of the spindle motor.

5. A recording and reproduction apparatus including at least one recording/reproducing head, and utilizing a recording medium, and first and second driving currents, comprising:
    a spindle motor for rotating the recording medium in response to the first driving current;
    carriage means responsive to the second driving current for supporting and moving the head with respect to the recording medium; and
    controlling means for interrupting the supply of the first driving current to the spindle motor when the carriage means is accelerating or decelerating the head to reduce power consumption of the apparatus.

* * * * *